US010797275B2

(12) United States Patent
Ito

(10) Patent No.: US 10,797,275 B2
(45) Date of Patent: Oct. 6, 2020

(54) ENERGY STORAGE DEVICE AND METHOD FOR MANUFACTURING THE ENERGY STORAGE DEVICE

(71) Applicant: GS Yuasa International Ltd., Kyoto-shi (JP)

(72) Inventor: Shun Ito, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 45 days.

(21) Appl. No.: 16/065,513

(22) PCT Filed: Dec. 28, 2016

(86) PCT No.: PCT/JP2016/089140
§ 371 (c)(1),
(2) Date: Jun. 22, 2018

(87) PCT Pub. No.: WO2017/115854
PCT Pub. Date: Jul. 6, 2017

(65) Prior Publication Data
US 2019/0006639 A1  Jan. 3, 2019

(30) Foreign Application Priority Data

Dec. 28, 2015 (JP) ................................. 2015-257527

(51) Int. Cl.
*H01M 2/00* (2006.01)
*H01M 2/06* (2006.01)
(Continued)

(52) U.S. Cl.
CPC .............. *H01M 2/06* (2013.01); *H01G 11/74* (2013.01); *H01G 11/78* (2013.01); *H01G 11/84* (2013.01);
(Continued)

(58) Field of Classification Search
CPC ........ H01G 11/74; H01G 11/78; H01G 11/84; H01G 9/0029; H01M 2/06; H01M 2/0404
See application file for complete search history.

(56) References Cited

U.S. PATENT DOCUMENTS 6,248,470 B1 * 6/2001 Azema .................... H01M 2/34
429/57
9,923,186 B2   3/2018 Tsunaki et al.
(Continued)

FOREIGN PATENT DOCUMENTS

JP    H01-170949 U   12/1989
JP    H 02-54162 U   4/1990
(Continued)

OTHER PUBLICATIONS

International Search Report (ISR) (PCT Form PCT/ISA/210), in PCT/JP2016/089140, dated Apr. 11, 2017.

*Primary Examiner* — Cynthia H Kelly
*Assistant Examiner* — Monique M Wills
(74) *Attorney, Agent, or Firm* — McGinn I.P. Law Group, PLLC

(57) ABSTRACT

An energy storage device includes: a conductive member (shaft portion) which penetrates a case and is connected to a terminal main body (bus bar connecting portion. The case includes: a through hole through which the conductive member penetrates; a concave portion which is at least a portion of a periphery of the through hole and is formed on one of an inner surface and an outer surface of the case, and a convex portion which is formed at a position opposite to the concave portion on an other of the inner surface and the outer surface of the case. In a plan view of the outer surface of the case, the terminal main body has a shape such that at least a portion of the terminal main body is larger than the concave portion.

20 Claims, 6 Drawing Sheets

(51) Int. Cl.

| | | |
|---|---|---|
| *H01M 2/30* | (2006.01) | |
| *H01G 11/74* | (2013.01) | |
| *H01G 11/78* | (2013.01) | |
| *H01G 11/84* | (2013.01) | |
| *H01M 2/04* | (2006.01) | |
| *H01G 9/00* | (2006.01) | |
| *H01G 9/008* | (2006.01) | |
| *H01G 9/08* | (2006.01) | |

(52) U.S. Cl.
CPC ........... *H01M 2/0404* (2013.01); *H01M 2/30* (2013.01); *H01G 9/008* (2013.01); *H01G 9/0029* (2013.01); *H01G 9/08* (2013.01)

(56) References Cited

U.S. PATENT DOCUMENTS

| | | |
|---|---|---|
| 2011/0200870 A1 | 8/2011 | Kim et al. |
| 2014/0242440 A1 | 8/2014 | Yamada et al. |
| 2016/0254517 A1 | 9/2016 | Tsunaki et al. |
| 2016/0351862 A1* | 12/2016 | Yun ....................... H01M 2/024 |

FOREIGN PATENT DOCUMENTS

| | | | |
|---|---|---|---|
| JP | 2000-113865 A | 4/2000 | |
| JP | 2005-056649 A | 3/2005 | |
| JP | 2010-157415 A | 7/2010 | |
| JP | 2011-165643 A | 8/2011 | |
| JP | 2014-072190 A | 4/2014 | |
| JP | 2014-165155 A | 9/2014 | |
| JP | 2017-041320 A | 2/2017 | |
| WO | WO 2015/059826 A1 | 4/2015 | |
| WO | WO 2016/170920 A1 | 10/2016 | |

* cited by examiner

ENERGY STORAGE DEVICE AND METHOD FOR MANUFACTURING THE ENERGY STORAGE DEVICE

TECHNICAL FIELD

The present invention relates an energy storage device having a conductive member which penetrates a case and a method for manufacturing the energy storage device.

BACKGROUND ART

In an energy storage device, an electrode assembly is housed in the inside of a case, and a terminal electrically connected to the electrode assembly is disposed in a state where the terminal is exposed from the case. For example, as described in patent document 1, a shaft portion of the terminal penetrates a lid plate which forms a portion of a case, and the shaft portion is electrically connected to the electrode assembly. Further, an insulator is interposed between the terminal and the lid plate. By swaging the shaft portion of the terminal, the insulator is brought into close contact with the terminal and the lid plate thus ensuring the insulation between the terminal and the lid plate.

PRIOR ART DOCUMENTS

Patent Documents

Patent Document 1: JP-A-2005-56649

SUMMARY OF THE INVENTION

Problems to be Solved by the Invention

In the above-mentioned configuration, however, a force also acts on the lid plate at the time of swaging the shaft portion of the terminal and hence, there is a possibility that the lid plate is deformed due to such a force.

The present invention is made in view of such circumstances, and it is an object of the present invention to suppress the deformation of a case of an energy storage device.

Means for Solving the Problems

To achieve the object, an energy storage device according to an aspect of the present invention includes: a conductive member which penetrates a case and is connected to a terminal main body, wherein the case includes: a through hole through which the conductive member penetrates; a concave portion which is at least a portion of a periphery of the through hole and is formed on one of an inner surface and an outer surface of the case; and a convex portion which is formed at a position opposite to the concave portion on an other of the inner surface and the outer surface of the case, and wherein, in a plan view of the outer surface, the terminal main body has a shape such that at least a portion of the terminal main body is larger than the concave portion.

Advantages of the Invention

According to the present invention, it is possible to suppress the deformation of the case.

MODE FOR CARRYING OUT THE INVENTION

Figure 1:
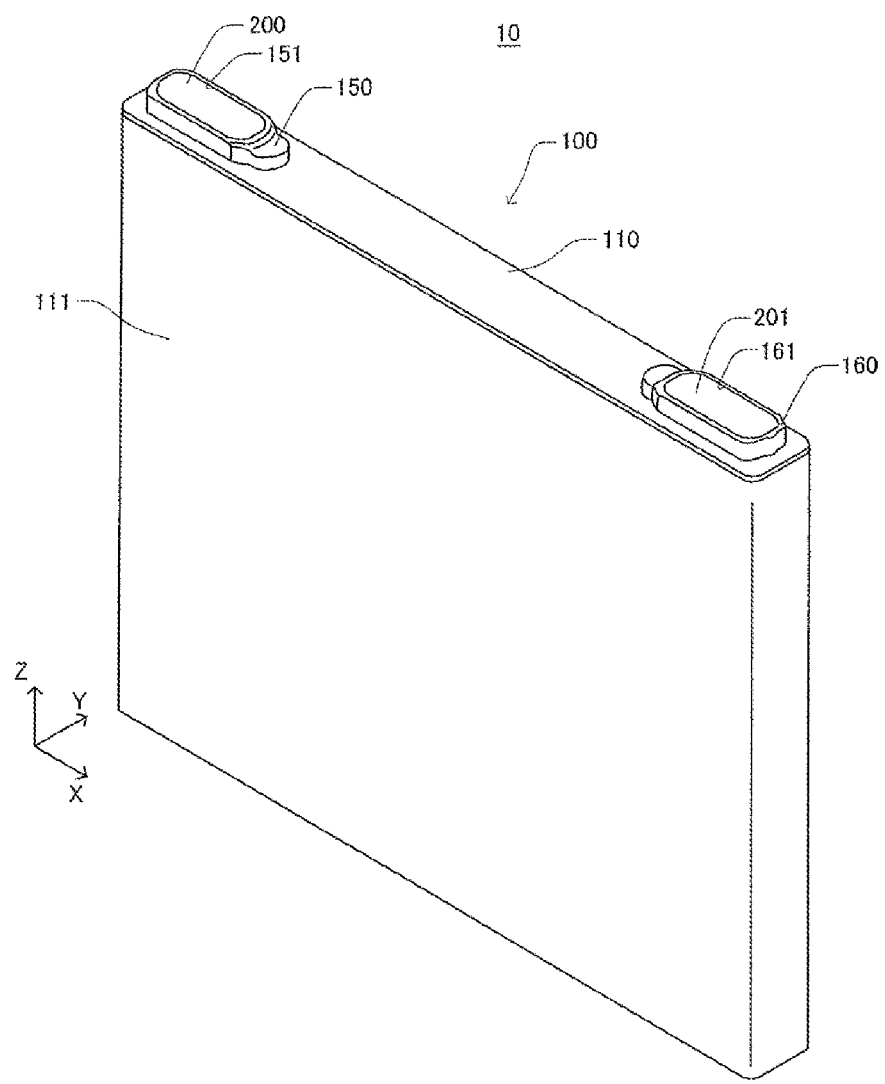
FIG. 1 is a perspective view schematically showing an external appearance of an energy storage device according to an embodiment.

To achieve the object, an energy storage device according to an aspect of the present invention includes: a conductive member which penetrates a case and is connected to a terminal main body, wherein the case includes: a through hole through which the conductive member penetrates; a concave portion which is at least a portion of a periphery of the through hole and is formed on one of an inner surface and an outer surface of the case; and a convex portion which is formed at a position opposite to the concave portion on an other of the inner surface and the outer surface of the case, and wherein, in a plan view of the outer surface, the terminal main body has a shape such that at least a portion of the terminal main body is larger than the concave portion.

With such a configuration, the case includes: the concave portion which is at least a portion of the periphery of the through hole and is formed on one of the inner surface and the outer surface of the case; and the convex portion which is formed at the position opposite to the concave portion on the other of the inner surface and the outer surface of the case and hence, the deformation of the case can be suppressed.

At least a portion of the terminal main body connected to the conductive member is larger than the concave portion and hence, the portion of the terminal main body projects out from the concave portion. That is, in fastening the conductive member by swaging or screwing by way of the terminal main body, a stress caused by fastening acts in a dispersed manner to the inside and the outside of the concave portion from the terminal main body. Accordingly, the deformation of the case can be suppressed.

The conductive member may include a swaged portion which is formed by swaging, and the convex portion may be formed on one of the inner surface and the outer surface on which the swaged portion is formed.

With such a configuration, the convex portion is formed on one of the inner surface and the outer surface of the case on which the swaged portion is formed and hence, a stress generated when the conductive member is swaged is received on a convex portion side. Accordingly, even compared with a case where the stress is received on a concave portion side, the deformation of the case can be suppressed more effectively.

In the plan view, the convex portion may be larger than the swaged portion.

With such a configuration, the convex portion is larger than the swaged portion in the plan view of an outer surface of the case and hence, a stress generated by fastening can be received by the whole convex portion. Accordingly, the deformation of portions of the case other than the convex portion can be suppressed with certainty.

In the plan view, the convex portion may have a shape which matches the concave portion.

With such a configuration, the convex portion has a shape which matches the concave portion in the plan view of an outer surface of the case and hence, a clearance between the concave portion and the convex portion (a difference in an external shape between the concave portion and the convex portion) can be eliminated. Accordingly, the case per se can be miniaturized.

In the plan view, the convex portion and the concave portion may have circular shapes so as to surround the through hole.

With such a configuration, the concave portion and the convex portion have circular shapes so as to surround the through hole in the plan view of the outer surface of the case and hence, it is possible to ensure a strength uniformly over the whole circumference of the through hole.

Assuming a plate thickness of the case as "t", a recessed amount of the concave portion and a protrusion amount of the convex portion may be t/5 or more and t/2 or less, and may be commensurate.

With such a configuration, a recessed amount of the concave portion and a protrusion amount of the convex portion are t/5 or more and t/2 or less, and are commensurate. Accordingly, lowering of a strength of the whole case can be suppressed, and a desired deformation suppressing effect can be acquired.

A method for manufacturing the energy storage device according to another aspect of the present invention includes: forming the concave portion and the convex portion by half-blanking a plate which composes the case.

With such a configuration, the concave portion and the convex portion of the case are formed by half-blanking. Accordingly, the shape of the concave portion and the shape of the convex portion can be made to match each other in the plan view of the outer surface of the case and hence, a clearance between the concave portion and the convex portion can be eliminated whereby the case per se can be miniaturized.

Hereinafter, energy storage devices according to embodiments of the present invention are described with reference to drawings. The embodiments described hereinafter are comprehensive and specific examples of the present invention. In the embodiments described hereinafter, numerical values, shapes, materials, constitutional elements, the arrangement positions and connection states of the constitutional elements, manufacturing steps and the order of the manufacturing steps and the like are merely examples, and these are not intended to be used for limiting the present invention. Further, out of the constitutional elements in the embodiments described hereinafter, the constitutional elements which are not described in independent claims describing an uppermost concept are described as arbitrary constitutional elements.

Embodiment

First, the configuration of an energy storage device 10 is described.

Figure 2:
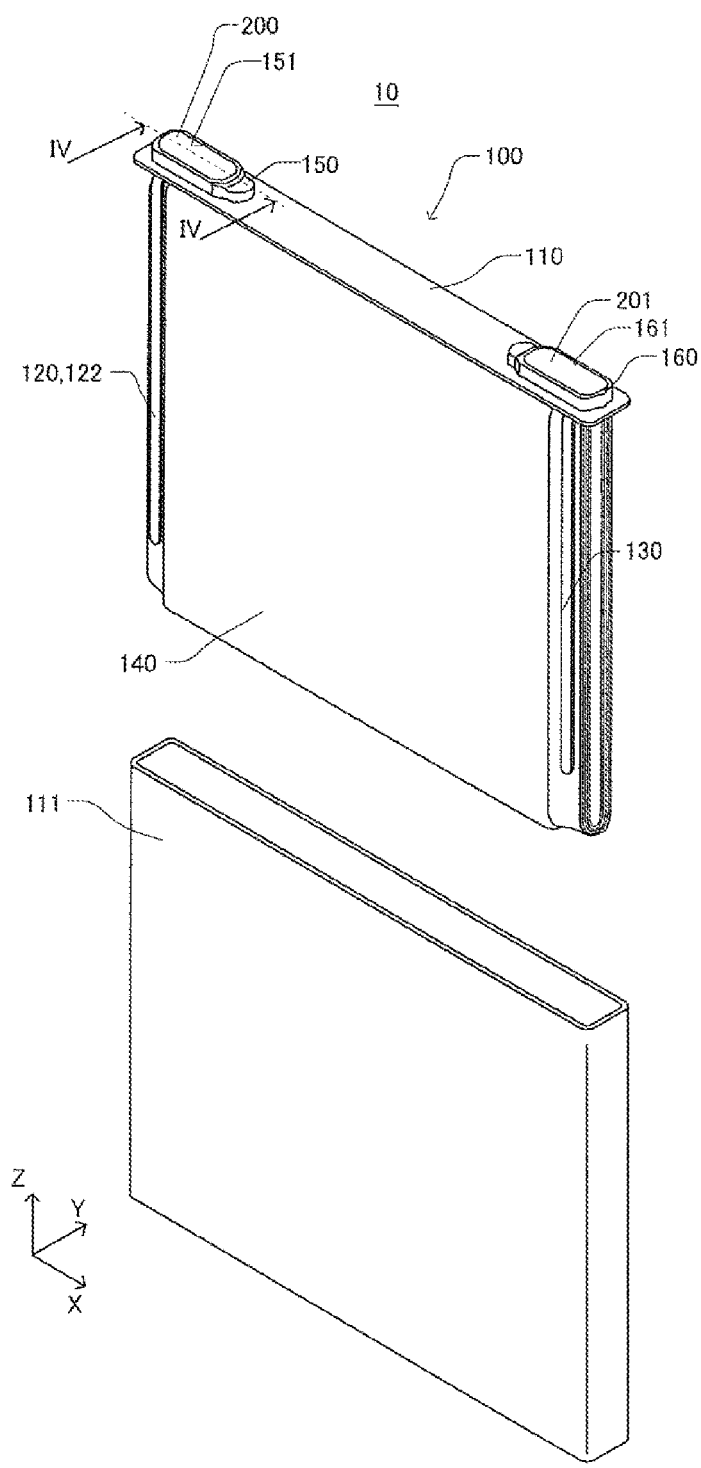
FIG. 2 is a perspective view showing respective constitutional elements which the energy storage device according to the present invention includes in a state where a case body of a case of the energy storage device is separated.

FIG. 1 is a perspective view schematically showing an external appearance of the energy storage device 10 according to the embodiment. FIG. 2 is a perspective view showing respective constitutional elements which the energy storage device 10 includes in a state where a case body 111 of a case 100 of the energy storage device 10 according to the embodiment is separated.

In these drawings, a Z axis direction is indicated as a vertical direction, and the description will be made hereinafter assuming the Z axis direction as the vertical direction. In an actual use state, there may also be a case where the Z axis direction does not agree with the vertical direction and hence, the Z axis direction is not limited to the vertical direction. The same definition is applicable also to drawings succeeding to FIG. 2.

The energy storage device 10 is a secondary battery which can charge electricity and discharge electricity. To be more specific, the energy storage device 10 is a nonaqueous electrolyte secondary battery such as a lithium ion secondary battery. The energy storage device 10 is not limited to a nonaqueous electrolyte secondary battery, and may be a secondary battery other than a nonaqueous electrolyte secondary battery, or may be a capacitor. Further, the energy storage device 10 may be a primary battery.

As shown in FIG. 1 and FIG. 2, the energy storage device 10 includes the case 100, a positive electrode terminal 200, and a negative electrode terminal 201, a positive electrode current collector 120 and a negative electrode current collector 130, a positive electrode first sealing member 150 and a negative electrode first sealing member 160, and an electrode assembly 140.

Although a liquid such as an electrolyte solution (nonaqueous electrolyte) is sealed in the case 100 of the energy storage device 10, the illustration of such a liquid is omitted. As the electrolyte solution sealed in the case 100, a kind of the electrolyte solution is not particularly limited and various kinds of electrolyte solution can be selected provided that performance of the energy storage device 10 is not impaired.

The case 100 is formed of; the case body 111 which has a bottomed rectangular cylindrical shape; and a lid plate 110 which is a plate-like member for closing an opening of the case body 111. The case 100 is configured such that the inside of the case 100 can be hermetically sealed by joining the lid plate 110 and the case body 111 to each other by welding or the like after the positive electrode current collector 120, the negative electrode current collector 130, the electrode assembly 140 and the like are accommodated in the inside of the case 100. A material for forming the lid plate 110 and a material for forming the case body 111 are not particularly limited. For example, the lid plate 110 and the case body 111 are preferably made of weldable metal such as stainless steel, aluminum, an aluminum alloy, iron, or a plated steel sheet.

The electrode assembly 140 is an energy storage element (power generating element) which includes a positive electrode, a negative electrode, and a separator, and can store electricity. The positive electrode is formed by forming a positive active material layer on a positive electrode substrate foil which is a metal foil having an elongated strip shape and made of aluminum, an aluminum alloy or the like. The negative electrode is formed by forming a negative active material layer on a negative electrode substrate foil which is a metal foil having an elongated strip shape and made of copper, a copper alloy, aluminum, an aluminum alloy or the like. The separator is formed of a microporous sheet made of a resin.

As a positive active material for forming the positive active material layer and a negative active material for forming the negative active material layer, a known material can be suitably used provided that the positive active material and the negative active material are made of a material capable of occluding and discharging lithium ions.

The electrode assembly 140 is formed by winding the negative electrode, the positive electrode, and the separator which are disposed in a layered manner in a state where the separator is disposed between the negative electrode and the positive electrode, and the electrode assembly 140 is electrically connected to the positive electrode current collector 120 and the negative electrode current collector 130. Although FIG. 2 shows the electrode assembly 140 having an elongated circular cross section, the electrode assembly 140 may have a circular shape or an elliptical shape in cross section. Further, the electrode assembly 140 is not limited to a winding-type electrode assembly, and may be a stacking-type electrode assembly where flat-plate-like electrode plates are stacked to each other.

The positive electrode terminal 200 is an external terminal which is disposed outside the case 100, and is electrically connected to the positive electrode of the electrode assembly 140. The negative electrode terminal 201 is an external terminal which is disposed outside the case 100, and is electrically connected to the negative electrode of the electrode assembly 140. That is, the positive electrode terminal 200 and the negative electrode terminal 201 are conductive electrode terminals through which electricity stored in the electrode assembly 140 is discharged to a space outside the energy storage device 10 and through which electricity is introduced into a space inside the energy storage device 10 for storing the electricity in the electrode assembly 140. The positive electrode terminal 200 and the negative electrode terminal 201 are mounted on the lid plate 110 by way of the positive electrode first sealing member 150 and the negative electrode first sealing member 160 respectively.

The positive electrode current collector 120 and the negative electrode current collector 130 are disposed inside the case 100, that is, on an inner surface of the lid plate 110 (a surface of the lid plate 110 on a minus side in the Z axis direction). To be more specific, the positive electrode current collector 120 is formed of a member having conductivity and rigidity, is disposed between the positive electrode of the electrode assembly 140 and a side wall of the case body 111, and is electrically connected to the positive electrode terminal 200 and the positive electrode of the electrode assembly 140. The negative electrode current collector 130 is formed of a member having conductivity and rigidity, is disposed between the negative electrode of the electrode assembly 140 and the side wall of the case body 111, and is electrically connected to the negative electrode terminal 201 and the negative electrode of the electrode assembly 140.

In the same manner as the positive electrode substrate foil of the electrode assembly 140, the positive electrode current collector 120 is made of aluminum, an aluminum alloy or the like. In the same manner as the negative electrode substrate foil of the electrode assembly 140, the negative electrode current collector 130 is made of copper, a copper alloy or the like.

The positive electrode first sealing member 150 and the negative electrode first sealing member 160 are respectively formed of an insulator, wherein at least a portion of the positive electrode first sealing member 150 is disposed between the positive electrode terminal 200 and the lid plate 110 and at least a portion of the negative electrode first sealing member 160 is disposed between the negative electrode terminal 201 and the lid plate 110. To be more specific, the positive electrode first sealing member 150 has an accommodating concave portion 151 with an upper side thereof open, and the positive electrode terminal 200 is accommodated in the inside of the accommodating concave portion 151. In the same manner, the negative electrode first sealing member 160 has a concave portion 161 with an upper side thereof open, and the negative electrode terminal 201 is accommodated in the inside of the concave portion 161. With such a configuration, the positive electrode terminal 200 and the negative electrode terminal 201 are mounted on the lid plate 110 in a partially exposed manner.

Next, the lid plate 110 is described.

Figure 3:
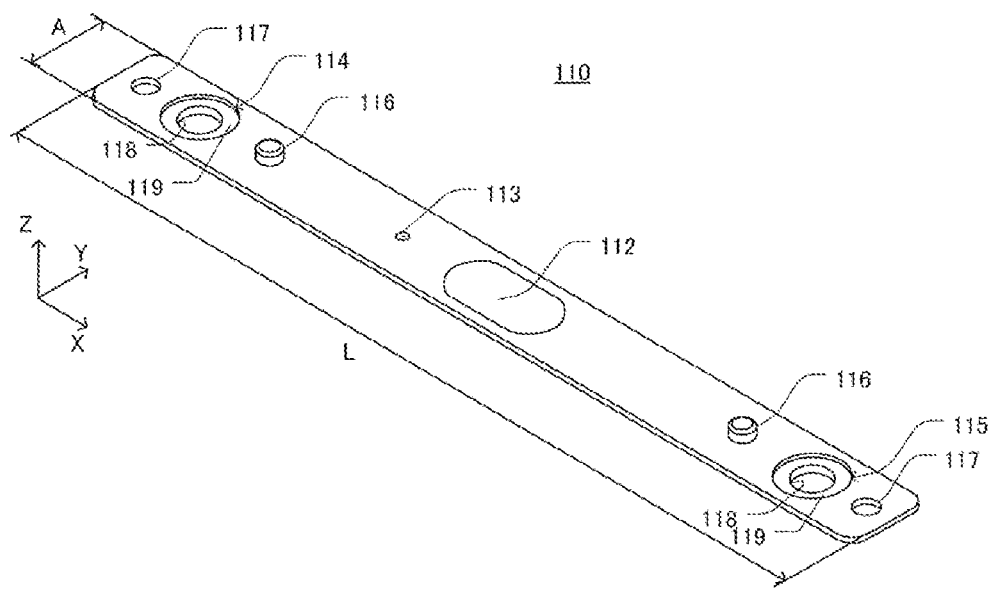
FIG. 3 is a perspective view showing the schematic configuration of a lid plate according to the embodiment.

FIG. 3 is a perspective view showing the schematic configuration of the lid plate 110 according to the embodiment.

As shown in FIG. 3, the lid plate 110 is an approximately rectangular plate as viewed in a top plan view, and respective corner portions are formed into a round shape. In the description made hereinafter, "as viewed in a plan view" means a case where an upper surface (outer surface) of the lid plate 110 is viewed in a plan view.

On the lid plate 110, a gas release valve 112, an electrolyte solution filling port 113, a positive electrode terminal mounting portion 114, a negative electrode terminal mounting portion 115, two first bulging portions 116, and two second bulging portions 117 are formed.

The gas release valve 112 is formed on a center portion of the lid plate 110 and has an elongated circular shape as viewed in a plan view. The gas release valve 112 has a smaller wall thickness than other portions of the lid plate 110. The gas release valve 112 plays a role of discharging a gas in the case 100 by being opened when an inner pressure of the case 100 is increased.

The electrolyte solution filling port 113 is a through hole for filling an electrolyte solution at the time of manufacturing the energy storage device 10. After the lid plate 110 is mounted on the case body 111 and an electrolyte solution is filled in the case body 111, the electrolyte solution filling port 113 is closed by fitting an electrolyte solution filling plug (not shown in the drawing) into the electrolyte solution filling port 113.

The positive electrode terminal mounting portion 114 is a portion on which a positive electrode terminal 200, a positive electrode first sealing member 150, a positive electrode second sealing member 170 (described later) and a positive electrode current collector 120 are mounted. The positive electrode terminal mounting portion 114 is mounted on one end portion of the lid plate 110. The negative electrode terminal mounting portion 115 is a portion on which a negative electrode terminal 201, a negative electrode first sealing member 160, a negative electrode second sealing member (not shown in the drawing) and a negative electrode current collector 130 are mounted. The negative electrode terminal mounting portion 115 is mounted on the other end portion of the lid plate 110.

Two first bulging portions 116 are respectively formed on the lid plate 110 by forming portions of the lid plate 110 in a shape bulging toward the outside of the case 100. Two first bulging portions 116 are used for positioning the positive electrode first sealing member 150 and the negative electrode first sealing member 160 respectively.

Two second bulging portions 117 are respectively formed on the lid plate 110 by forming portions of the lid plate 110 in a shape bulging toward the inside of the case 100. Two second bulging portions 117 are used for positioning the positive electrode first sealing member 150 and the negative electrode first sealing member 160 respectively and, at the same time, for positioning a positive electrode second sealing member 170 (described later) and a negative electrode second sealing member (not shown in the drawing). The specific configurations of the positive electrode terminal mounting portion 114, the negative electrode terminal mounting portion 115, the first bulging portion 116 and the second bulging portion 117 are described later.

Next, the fixing structure for fixing the positive electrode terminal 200, the lid plate 110, the positive electrode first sealing member 150 and the positive electrode second sealing member 170 is described in detail. The fixing structure on a negative electrode side is substantially equal to the fixing structure on the positive electrode side and hence, the description of the fixing structure on the negative electrode side is omitted.

Figure 4:
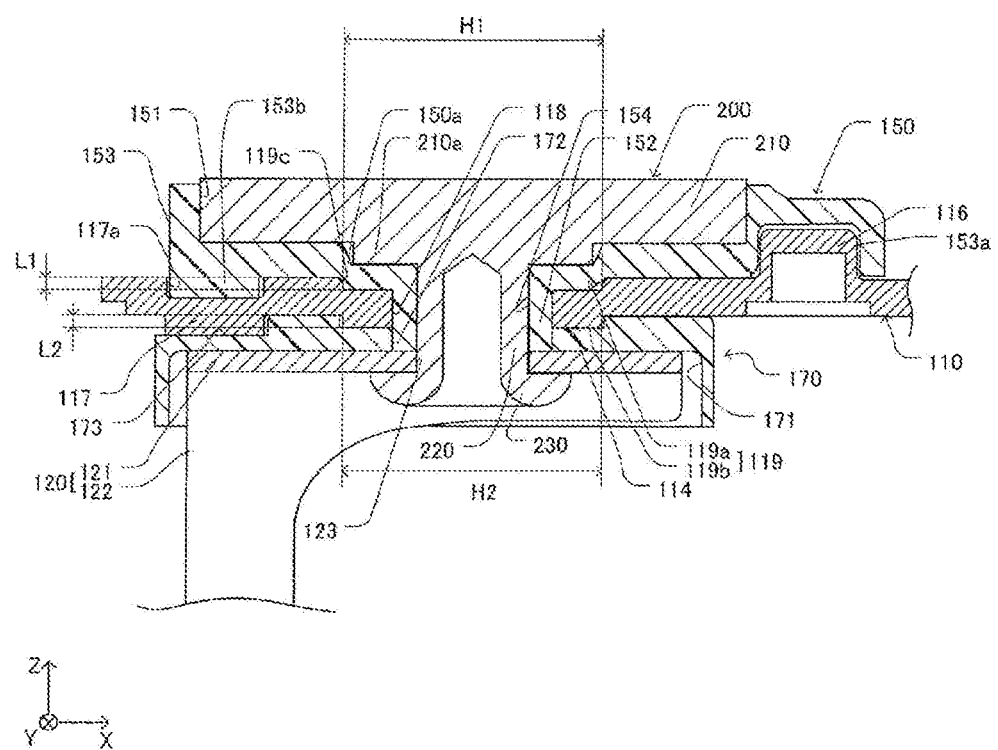
FIG. 4 is a cross-sectional view showing a structure for fixing a positive electrode terminal, the lid plate, a positive electrode first sealing member and a positive electrode second sealing member according to the embodiment.

FIG. 4 is a cross-sectional view showing the fixing structure for fixing the positive electrode terminal 200, the lid plate 110, the positive electrode first sealing member 150 and the positive electrode second sealing member 170. FIG. 4 is a cross-sectional view showing a configuration taken along a ZX plane including line IV-IV in FIG. 2.

As shown in FIG. 4, the positive electrode terminal 200 is mounted on the lid plate 110 in a state where the positive electrode terminal 200 is accommodated in the positive electrode first sealing member 150 and, further, the positive electrode current collector 120 is mounted on the positive electrode first sealing member 150 by way of the positive electrode second sealing member 170 so that these constitutional elements are integrally fixed to each other.

First, the specific configurations of the respective members are described.

Figure 5:
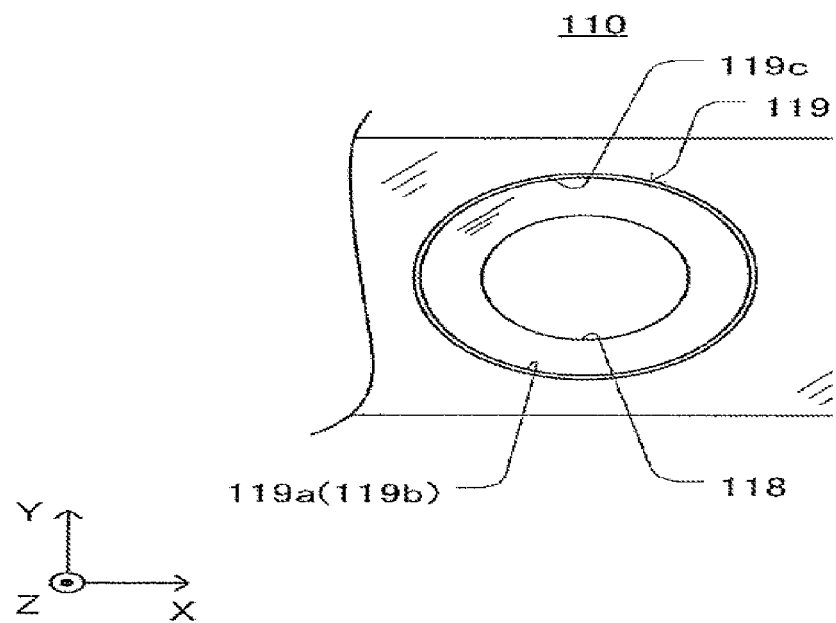
FIG. 5 is a top plan view showing the schematic configuration of a positive electrode terminal mounting portion according to the embodiment.

FIG. 5 is a top plan view showing the schematic configuration of the positive electrode terminal mounting portion 114.

As shown in FIG. 4 and FIG. 5, the positive electrode terminal mounting portion 114 of the lid plate 110 has a through hole 118 and a stepped portion 119.

The through hole 118 is a through hole having a circular shape as viewed in a plan view. The shaft portion 220 of the positive electrode terminal 200 penetrates the through hole 118.

The stepped portion 119 is formed in a circular shape concentrically with the through hole 118 such that the stepped portion 119 surrounds the whole circumference of the through hole 118. The through hole 118 is formed at the center of a bottom portion of the stepped portion 119. That is, the stepped portion 119 is disposed on an outer peripheral portion of the through hole 118. The stepped portion 119 has: a concave portion 119a formed on one main surface of the lid plate 110; and a convex portion 119b formed on the other main surface of the lid plate 110. One main surface of the lid plate 110 forms the outer surface of the case 100 in a state where the lid plate 110 is mounted on the case body 111, and the other main surface of the lid plate 110 forms the inner surface of the case 100 in the state where the lid plate 110 is mounted on the case body 111. The concave portion 119a and the convex portion 119b are disposed opposite to each other. As shown in FIG. 4, an inner diameter H1 of the concave portion 119a and an outer diameter H2 of the convex portion 119b are substantially equal. In FIG. 5, the convex portion 119b overlaps with the concave portion 119a as viewed in a plan view. That is, the shape of the concave portion 119a and the shape of the convex portion 119b as viewed in a plan view of the lid plate 110 (plan view shape) match each other. In such a configuration, "match each other" also includes a case where the plan view shapes of the concave portion 119a and the convex portion 119b slightly differ from each other although the plan view shapes of the concave portion 119a and the convex portion 119b do not completely match each other. In this case, it is sufficient that a size difference between the concave portion 119a and the convex portion 119b fall within an allowable range when the stepped portion 119 is formed by half-blanking. That is, the stepped portion 119 is formed by stopping a hole forming step in the course of the step.

Further, as shown in FIG. 4, assume a length from one main surface of the lid plate 110 to an inner bottom surface of the concave portion 119a as a recessed amount L1 of the concave portion 119a. Also, assume a length from the other main surface of the lid plate 110 to an outer bottom surface of the convex portion 119b as a protrusion amount L2 of the convex portion 119b. Assuming a plate thickness of the lid plate 110 as "t", a recessed amount L1 of the concave portion and a protrusion amount L2 of the convex portion are t/5 or more and t/2 or less, and are commensurate. It is sufficient that the recessed amount L1 and the protrusion amount L2 be substantially commensurate.

According to finding made by inventors of the present invention, it is desirable that a width A of the lid plate 110 in a Y axis direction (see FIG. 3) and an outer diameter H2 of the convex portion 119b satisfy a relationship expressed by a formula (1).

$$0.15A \leq H2 \leq 0.9A \tag{1}$$

When the outer diameter H2 of the convex portion 119b is excessively small, the through hole 118 and the shaft portion 220 of the positive electrode terminal 200 also become small and hence, an amount of electric current also becomes small. On the other hand, when the outer diameter H2 is excessively large, assembling property of the lid plate 110 with the case body 111 becomes unstable. From these points of view, the relationship expressed by the formula (1) is obtained.

For example, assuming a case where the width A is 10 mm, the minimum value of the outer diameter H2 becomes 1.5 mm and a maximum value of the outer diameter H2 becomes 9 mm. Assuming a case where the width A is 20 mm, the minimum value of the outer diameter H2 becomes 3 mm and the maximum value of the outer diameter H2 becomes 18 mm. Assuming a case where the width A is 50 mm, the minimum value of the outer diameter H2 becomes 7.5 mm and the maximum value of the outer diameter H2 becomes 45 mm.

These values are just ideal values. In actually designing the lid plate 110, it is necessary to set these values to values which fall within a range suitable for the manufacture and the use of the lid plate 110. Accordingly, as an actually available value, assuming a case where the width A is 10 mm, the minimum design value of the outer diameter H2 becomes 6 mm and the maximum design value of the outer diameter H2 becomes 7 mm. Assuming a case where the width A is 20 mm, the minimum design value of the outer diameter H2 becomes 7 mm and the maximum design value of the outer diameter H2 becomes 15 mm. Assuming a case where the width A is 50 mm, the minimum design value of the outer diameter H2 becomes 8 mm and the maximum design value of the outer diameter H2 becomes 30 mm. In all cases, the respective design values satisfy the above-mentioned relationship.

With respect to the energy storage device 10, the case is considered where the energy storage device 10 is a thin energy storage device. In this case, "thin energy storage device" is an energy storage device where a width A of the lid plate 110 is 30 mm or less, and preferably 20 mm or less. Further, the energy storage device 10 is an energy storage device where the width A of the lid plate 110 and a length L of the lid plate 110 in an X axis direction satisfy a relationship of A≤L/5. It is preferable that the energy storage device 10 be an energy storage device where a relationship of A≤L/8 is satisfied.

Accordingly, with respect to the relationship expressed by the formula (1), by substituting the width A of the lid plate 110 with a value of 30 mm or less or 20 mm or less, the outer diameter H2 of the convex portion 119b in the thin energy storage device 10 can be obtained. Also in this case, the values which can be obtained are ideal values. It is desirable to use a following formula (2) to obtain the maximum design value and the minimum design value of the outer diameter H2.

$$0.25A \leq H2 \leq 0.75A \quad (2)$$

In the case of the energy storage device 10 which satisfies such a relationship, when the plate thickness t of the lid plate 110 becomes excessively small, the lid plate 110 is liable to be easily deformed. On the other hand, when the plate thickness t becomes excessively large, the formation of the gas release valve 112 is difficult and, further, the excessively large plate thickness t is also disadvantageous from a view point of energy density and a manufacturing cost. By taking these matters into consideration, the inventors of the present invention have found that it is desirable to set the plate thickness t of the lid plate 110 in the thin energy storage device 10 to a value which falls within a range of from 0.5 mm to 3.0 mm inclusive.

From the above, in the energy storage device 10 according to this embodiment, the plate thickness t of the lid plate 110 is set to 1.5 mm, the width A of the lid plate 110 is set to 14.7 mm, and the outer diameter H2 of the convex portion 119b is set to 10.5 mm.

In this embodiment, the case is exemplified where the convex portion 119b has a circular plan view shape. However, in the case where the plan view shape of the convex portion 119b is an elongated circular shape extending in an X axis direction, the respective sizes may be decided by setting the width of the convex portion 119b in the Y axis direction to the outer diameter H2.

As shown in FIG. 4 and FIG. 5, an outer periphery of the concave portion 119a is chamfered over the whole circumference, and a corner portion of the outer periphery is formed into a tapered surface 119c. The tapered surface 119c may be formed by press working or cutting working.

The first bulging portion 116 formed on the lid plate 110 on a positive electrode side is disposed in the vicinity of the positive electrode terminal mounting portion 114 on a gas release valve 112 side. The first bulging portion 116 has a shape such that the first bulging portion 116 bulges toward the outside from one main surface of the lid plate 110. The first bulging portion 116 is formed into a hollow shape with the other surface side of the first bulging portion 116 opened. The positive electrode first sealing member 150 is positioned due to the engagement of the first bulging portion 116 with an engaging concave portion 153a of the positive electrode first sealing member 150.

The second bulging portion 117 formed on the lid plate 110 on a positive electrode side is disposed in the vicinity of the positive electrode terminal mounting portion 114 on a side opposite to the first bulging portion 116. The second bulging portion 117 has a shape such that the second bulging portion 117 bulges toward the inside from the other main surface of the lid plate 110. The second bulging portion 117 is formed into a hollow shape with the other surface side of the second bulging portion 117 opened. The positive electrode second sealing member 170 is positioned due to the engagement of a portion of the positive electrode second sealing member 170 with the second bulging portion 117. Further, the positive electrode first sealing member 150 is positioned due to the engagement of the engaging convex portion 153b of the positive electrode first sealing member 150 with the hollow portion 117a of the second bulging portion 117.

The positive electrode first sealing member 150 includes a terminal accommodating portion 153 and the cylindrical portion 152 as integral parts thereof.

In the terminal accommodating portion 153, the accommodating concave portion 151 having a concave shape which accommodates a bus bar connecting portion 210 of the positive electrode terminal 200 is formed.

The cylindrical portion 152 projects downward from a lower surface of the terminal accommodating portion 153 in a cylindrical shape. A through hole 154 of the cylindrical portion 152 has the same shape as the through hole 123 of the positive electrode current collector 120. The through hole 154 is disposed continuously with the through hole 123 of the positive electrode current collector 120, and the shaft portion 220 of the positive electrode terminal 200 is inserted into these through holes 154, 123. An outer diameter of the cylindrical portion 152 is set to a size which allows the insertion of the cylindrical portion 152 into the through holes 172, 118.

On a bottom surface of an end portion of the terminal accommodating portion 153 on a gas release valve 112 side, the engaging concave portion 153a which engages with the first bulging portion 116 of the lid plate 110 is formed. On the other hand, on the bottom surface of the end portion of the terminal accommodating portion 153 on a side opposite to the engaging concave portion 153a, the engaging convex portion 153b which engages with the hollow portion 117a of the second bulging portion 117 of the lid plate 110 is formed. Since the engaging concave portion 153a engages with the first bulging portion 116 and the engaging convex portion 153b engages with the hollow portion 117a of the second bulging portion 117, the positive electrode first sealing member 150 is positioned at two places.

The positive electrode first sealing member 150 may be formed of a member having lower rigidity than the lid plate 110 and having insulating property. The positive electrode first sealing member 150 may be, for example, made of a resin such as polyolefin, polyphenylene sulfide (PPS), polypropylene (PP), a fluororesin (PFA), or a phenol resin. The positive electrode first sealing member 150 may be made of other resins. The positive electrode first sealing member 150 may be made of a resin into which fibers such as glass fibers are mixed. Further, the positive electrode first sealing member 150 may adopt a structure where the positive electrode first sealing member 150 is formed of two or more members made of different resin materials. In this case, PFA or the like may be used as a resin material of a portion of the insulating member for ensuring gas tightness, and ABS, polybutylene terephthalate (PBT), polyamide (also referred to as nylon) or the like may be used as a resin material for forming a portion of the insulating member which requires a structural strength.

The positive electrode second sealing member 170 is an insulator where at least a portion of the positive electrode second sealing member 170 is disposed between the positive electrode current collector 120 and the lid plate 110.

A current collector holding portion 171 having a concave shape which holds a current collector body portion 121 of the positive electrode current collector 120 is formed on a bottom surface of the positive electrode second sealing member 170. The through hole 172 having the same shape as the through hole 118 of the lid plate 110 is formed in the current collector holding portion 171. The through hole 172 is disposed such that the through hole 172 is formed continuously with the through hole 118 of the lid plate 110. The cylindrical portion 152 of the positive electrode first sealing member 150 is inserted into these through holes 172, 118. The shaft portion 220 of the positive electrode terminal 200 is inserted into the cylindrical portion 152. In this manner, the shaft portion 220 of the positive electrode terminal 200 penetrates the lid plate 110 by way of the through hole 118 together with the cylindrical portion 152 of the positive electrode first sealing member 150 which is an insulator.

An engaging concave portion 173 with which the second bulging portion 117 engages is formed on an upper surface (a surface on a lid plate 110 side) of the positive electrode second sealing member 170 at the position which faces the second bulging portion 117. The positive electrode second sealing member 170 is positioned due to the engagement of the second bulging portion 117 with the engaging concave portion 173.

The positive electrode second sealing member 170 is preferably made of a material having lower rigidity than the lid plate 110 and having insulating property. The positive electrode second sealing member 170 is formed using a resin such as PPS, PP, PE, PBT, PFA, PEEK, for example.

The positive electrode current collector 120 includes the current collector body portion 121 and an electrode assembly connecting portion 122 as integral parts thereof.

The current collector body portion 121 is a portion to which the positive electrode terminal 200 is connected. To be more specific, the current collector body portion 121 is formed into a flat plate shape, and has a through hole 123 into which the shaft portion 220 of the positive electrode terminal 200 is inserted.

The electrode assembly connecting portion 122 is formed of two elongated legs (only one leg shown in FIG. 4) electrically connected to the positive electrode of the electrode assembly 140. The electrode assembly connecting portion 122 is disposed on an outer side (a minus side in the X axis direction) with respect to the through hole 123 of the current collector body portion 121. The electrode assembly connecting portion 122 is fixed to the positive electrode in a state where the electrode assembly connecting portion 122 clamps the positive electrode of the electrode assembly 140 in the Y axis direction (see FIG. 2).

The positive electrode terminal 200 includes the bus bar connecting portion 210 and the shaft portion 220 as integral parts thereof.

The bus bar connecting portion 210 is a terminal main body to which a bus bar (not shown in the drawing) for connecting electrode terminals of the energy storage devices 10 is connected, and an upper surface of the bus bar connecting portion 210 is formed into a planar surface. The bus bar connecting portion 210 is formed such that at least a portion of the bus bar connecting portion 210 is larger than the stepped portion 119 in shape as viewed in a plan view. To be more specific, the bus bar connecting portion 210 is formed such that both end portions of the bus bar connecting portion 210 project from the stepped portion 119 in an X axis direction (a longitudinal direction of the lid plate 110) as viewed in a plan view. A pedestal 210a which projects downward is formed on a lower surface of the bus bar connecting portion 210. The pedestal 210a is formed in a shape such that the pedestal 210a is accommodated in the concave portion 119a of the lid plate 110 as viewed in a plan view. To be more specific, the pedestal 210a is formed in a circular shape as viewed in a plan view with a diameter thereof smaller than the inner diameter H1 of the concave portion 119a. A portion of the bus bar connecting portion 210 where the pedestal 210a is formed has a larger thickness than other portions of the bus bar connecting portion 210. With such a configuration, the bus bar connecting portion 210 can ensure a heat capacity by the pedestal 210a when a bus bar is welded to the bus bar connecting portion 210.

The shaft portion 220 is a conductive member connected to the bus bar connecting portion 210 which is the terminal main body. The shaft portion 220 extends downward from a lower surface of the pedestal 210a. By swaging a distal end portion 230 of the shaft portion 220, the positive electrode first sealing member 150, the positive electrode second sealing member 170, and the positive electrode current collector 120 are fixed to the lid plate 110. The distal end portion 230 of the shaft portion 220 forms a swaged portion, and is disposed in the inside of the case 100. The distal end portion 230 is formed in a circular annular shape as viewed in a plan view, and is brought into close contact with a surface of the current collector body portion 121. An outer diameter of the distal end portion 230 is set smaller than the inner diameter H1 of the concave portion 119a of the lid plate 110. The distal end portion 230 and the bus bar connecting portion 210 fasten the current collector body portion 121 of the positive electrode current collector 120, the positive electrode first sealing member 150, the positive electrode second sealing member 170, and the lid plate 110 by sandwiching the current collector body portion 121 of the positive electrode current collector 120, the positive electrode first sealing member 150, the positive electrode second sealing member 170, and the lid plate 110 therebetween in the Z axis direction. An inner diameter of the concave portion 119a of the lid plate 110 is larger than the diameter of the pedestal 210a of the positive electrode terminal 200 and is also larger than a diameter of the distal end portion 230 of the shaft portion 220 and hence, a stress generated by fastening can be received by the stepped portion 119 of the lid plate 110 in a stable manner. In such a configuration, by setting the inner diameter of the concave portion 119a and the outer diameter of the pedestal 210a closer, a stress can be received in a more stable manner. However, when the inner diameter of the concave portion of 119a and the outer diameter of the pedestal 210a are set excessively closer to each other, a portion (thin wall thickness portion 150a) of the positive electrode first sealing member 150 sandwiched between an inner periphery of the concave portion 119a and an outer periphery of the pedestal 210a becomes thin. This phenomenon occurs conspicuously when a wall thickness of the positive electrode first sealing member 150 is reduced so as to miniaturize the whole energy storage device 10. When the thin wall thickness portion 150a is thin, not only breaking due to swaging is liable to easily occur but also there is a possibility that the degradation with time of the positive electrode first sealing member 150 is accelerated. To suppress the occurrence of such a phenomenon, in this embodiment, a tapered surface 119c is formed over the whole circumference of the outer periphery of the concave portion 119a thus ensuring a space where the thin wall thickness portion 150a is disposed. With such a configuration, a wall thickness of the thin wall thickness portion 150a can be increased.

Next, a method for manufacturing the energy storage device 10 according to the embodiment is described.

First, a method for manufacturing the lid plate 110 is described.

FIG. 6A, FIG. 6B, FIG. 6C, and FIG. 6D are partial cross-sectional views showing one step of the method for manufacturing the lid plate 110.

Figure 6A:
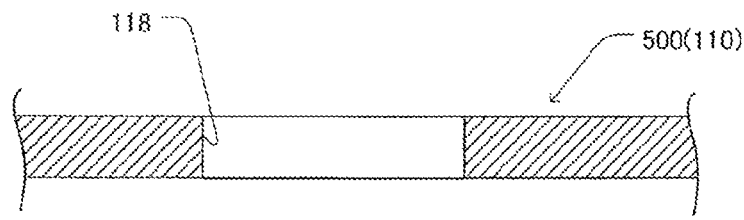
FIG. 6A is a partial cross-sectional view showing one step of a method for manufacturing the lid plate according to the embodiment.

As shown in FIG. 6A, a plate 500 which becomes the lid plate 110 is prepared. The through hole 118 is formed in the plate 500 preliminarily.

Figure 6B:
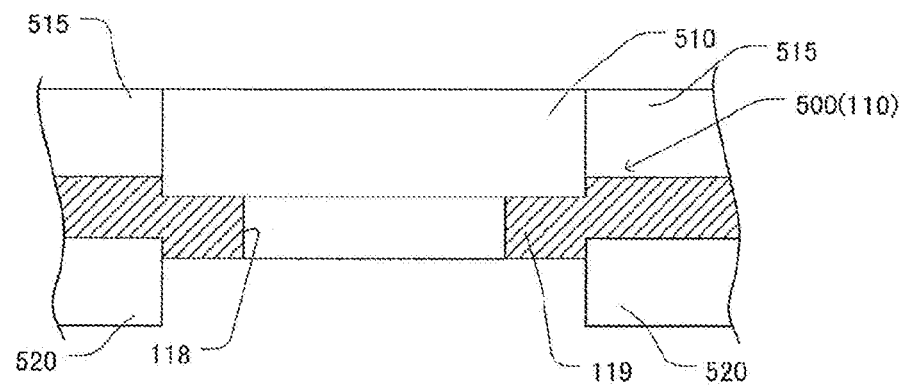
FIG. 6B is a partial cross-sectional view showing another step of a method for manufacturing the lid plate according to the embodiment.

Next, half-blanking is applied to the plate 500 as shown in FIG. 6B. In this embodiment, half-blanking means working where the plate 500 is sheared vertically in a thickness direction of the plate 500 without completely punching out the plate 500 thus forming the stepped portion 119 by a punch 510 and a die 520 used in a press process. A presser 515 which constrains the plate 500 together with the die 520 is disposed around the punch 510. Accordingly, a thickness of a portion pressed down by half-blanking becomes substantially equal to a thickness of the original plate 500. Further, the recessed amount L1 of the concave portion 119a and the protrusion amount L2 of the convex portion 119b also become substantially equal.

Figure 6C:
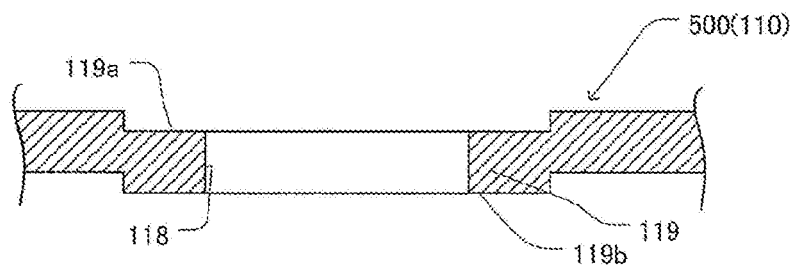
FIG. 6C is a partial cross-sectional view showing another step of a method for manufacturing the lid plate according to the embodiment.

When half-blanking is completed, the plate 500 is brought into a state shown in FIG. 6C. Due to this half-blanking, the shape of the concave portion 119a of the stepped portion 119 as viewed in a front view and the shape of the convex portion 119b of the stepped portion 119 as viewed in a front view substantially match each other.

Figure 6D:
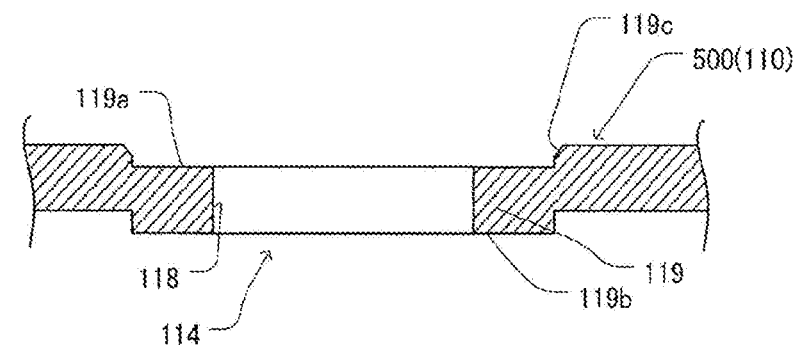
FIG. 6D is a partial cross-sectional view showing another step of a method for manufacturing the lid plate according to the embodiment.

Then, as shown in FIG. 6D, chamfering is applied to the outer periphery of the concave portion 119a so that the positive electrode terminal mounting portion 114 having the tapered surface 119c is formed on the plate 500.

The negative electrode terminal mounting portion 115 is also formed by the same step used for forming the positive electrode terminal mounting portion 114. Further, other portions (the gas release valve 112, the electrolyte solution filling port 113, two first bulging portions 116, and two second bulging portions 117) are also formed on the plate 500 by press working. With such a step, the plate lid 110 is completed.

Next, the positive electrode first sealing member 150, the positive electrode second sealing member 170, the positive electrode current collector 120, and the positive electrode terminal 200 are mounted on the lid plate 110, and the negative electrode first sealing member 160, the negative electrode second sealing member (not shown in the drawing), the negative electrode current collector 130, and the negative electrode terminal 201 are also mounted on the lid plate 110.

Then, the positive electrode of the electrode assembly 140 is mounted on the positive electrode current collector 120 and, the negative electrode of the electrode assembly 140 is mounted on the negative electrode current collector 130.

Thereafter, in a state shown in FIG. 2, the electrode assembly 140 is accommodated in the case body 111 of the case 100, and the lid plate 110 is welded to the case body 111 thus assembling the case 100. Next, an electrolyte solution is poured into the electrolyte solution filling port 113 and, thereafter, the electrolyte solution filling port 113 is closed by welding an electrolyte solution filling plug to the lid plate 110 thus manufacturing the energy storage device 10 shown in FIG. 1.

In this embodiment, the inventors of the present invention analyzed the lid plate 110 according to this embodiment and a lid plate having neither the concave portion 119a nor the convex portion 119b by a well-known linear analysis. With respect to analysis conditions, the lid plate 110 according to this embodiment and the lid plate having neither the concave portion 119a nor the convex portion 119b differ from each other only in the presence or the non-presence of the concave portion 119a and the convex portion 119b, and are equal in other conditions. As a result, the lid plate having neither the concave portion 119a nor the convex portion 119b generates an amount of deformation which is just under three times an amount of deformation of the lid plate 110 according to the embodiment.

That is, in this embodiment, the concave portion 119a formed on the outer surface of the lid plate 110 and the convex portion 119b formed on the inner surface of the lid plate 110 at a position opposite to the concave portion 119a are provided at portions of the periphery of the through hole 118. Accordingly, the deformation of the lid plate 110 can be suppressed.

Further, a portion of the bus bar connecting portion 210 is larger than the concave portion 119a and hence, the portion of the bus bar connecting portion 210 projects from the concave portion 119a. That is, at the time of swaging the shaft portion 220 by way of the bus bar connecting portion 210, a stress generated by such fastening acts on the inside and the outside of the concave portion 119a from the bus bar connecting portion 210 in a dispersed manner. Accordingly, the deformation of the lid plate 110 can be suppressed.

In the case where the lid plate 110 is deformed, not only reliable joining between the lid plate 110 and the case body 111 is impaired but also the connecting position of the bus bar is displaced. In this manner, the deformation of the lid plate 110 has a possibility of producing a defective product. However, when the deformation of the lid plate 110 can be suppressed as in the case of this embodiment, the production of a defective product can be suppressed.

At least a portion of the bus bar connecting portion 210 is larger than the concave portion 119a as viewed in a plan view of the lid plate 110, a region where a bus bar is welded to the bus bar connecting portion 210 (welding region) can be ensured. By making the bus bar connecting portion 210 project from the concave portion 119a in the longitudinal direction as in the case of this embodiment, even when a thickness of the energy storage device 10 is reduced, it is possible to ensure a welding region in the longitudinal direction.

The convex portion 119b is formed on one of the inner surface and the outer surface of the lid plate 110 on a side where the swaged portion (distal end portion 230) is positioned and hence, a stress generated at the time of swaging the shaft portion 220 can be received on a convex portion 119b side. Accordingly, compared to the case where such a stress is received by the concave portion 119a, the deformation of the lid plate 110 can be suppressed more.

The convex portion 119b is larger than the swaged portion (distal end portion 230) as viewed in a plan view and hence, a stress which acts on the swaged portion can be received by the whole convex portion 119b. Accordingly, the deformation of the lid plate 110 outside the convex portion 119b can be suppressed with certainty.

A plan view shape of the concave portion 119a and a plan view shape of the convex portion 119b substantially match each other by forming the concave portion 119a and the convex portion 119b by half-blanking. Accordingly, a clearance between the concave portion 119a and the convex portion 119b (a difference between the concave portion 119a and the convex portion 119b in profile) can be eliminated and hence, the miniaturization of the lid plate 110 per se and, eventually, the miniaturization of the energy storage device 10 can be realized.

Figure 7:
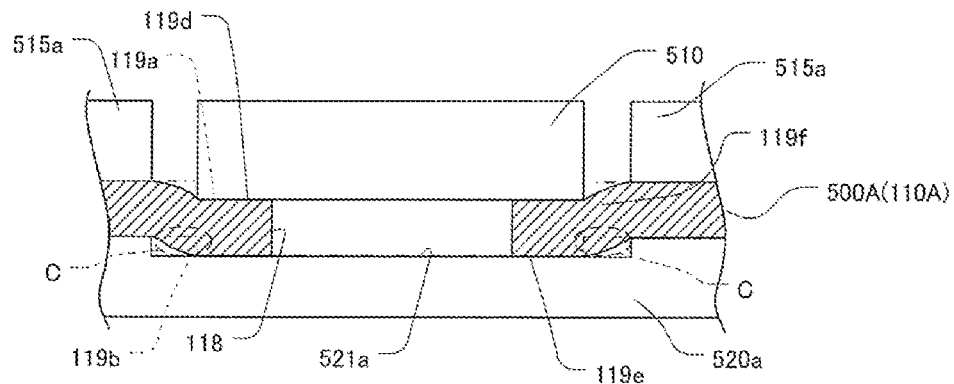
FIG. 7 is a partial cross-sectional view showing one step of a method for manufacturing a lid plate according to a comparison example.

FIG. 7 is a partial cross-sectional view showing one step at the time of manufacturing a lid plate 110A according to a comparison example.

As shown in FIG. 7, the concave portion 119d and the convex portion 119e are formed on the lid plate 110A by drawing. To be more specific, in performing the drawing, press working is applied to a plate body 500A to be formed into the lid plate 110A by a punch 510 and a die 520a. In this operation, the same punch 510 used in the above-mentioned half blanking is used. The die 520a is a die for drawing working, and a recess 521a corresponding to the convex portion 119e of the lid plate 110A is formed. After press working, the convex portion 119e is supported on a bottom surface of the recess 521a. A presser 515a which clamps the plate 500A together with the die 520a is arranged around the punch 510. The presser 515a is disposed in a spaced-apart manner with respect to the punch 510 in a horizontal direction. Although the presser 515a sandwiches the plate 500A, the presser 515a does not completely constrain the plate 500A. With such a configuration, when drawing is applied to the plate 500A, a portion which forms the concave portion 119d and a portion which forms the convex portion 119e are pulled out in a drawing direction while substantially keeping a fixed wall thickness thereof together with other portions so that outer edge portions 119f of the concave portion 119d and the convex portion 119e are formed into a bowl shape. Due to the formation of the outer edge portions 119f, an inner space of the lid plate 110A is compressed (see a portion surrounded by a broken line C in FIG. 7, for example).

On the other hand, a two-dot chain line shown in FIG. 7 indicates profiles of the concave portion 119a and the convex portion 119b of the lid plate 110 according to the embodiment. Since the concave portion 119a and the convex portion 119b of the lid plate 110 are formed by half-blanking, unlike the lid plate 110A of the comparison example, the concave portion 119a and the convex portion 119b are formed in a stepped manner and are not formed in a bowl shape. Accordingly, compared to the lid plate 110A formed by drawing, an inner space of the lid plate 110 can be increased and hence, it is possible to ensure an effective space.

In a plan view, the concave portion 119a and the convex portion 119b have circular shapes so as to surround the through hole 118 and hence, the lid plate 110 can uniformly ensure a strength over the whole circumference of the through hole 118.

When the recessed amount L1 of the concave portion 119a and the protrusion amount L2 of the convex portion 119b are excessively large, a strength of the entire lid plate 110 is lowered. On the other hand, when the recessed amount L1 of the concave portion 119a and the protrusion amount L2 of the convex portion 119b are small, the desired suppression of deformation cannot be realized. In this embodiment, the recessed amount L1 of the concave portion 119a and the protrusion amount L2 of the convex portion 119b are t/5 or more and t/2 or less, and are commensurate and hence, lowering of a strength of the whole lid plate 110 can be suppressed, and desired deformation suppressing effect can be acquired.

(Modification 1)

Next, the modification 1 according to the above-mentioned embodiment is described. In the above-mentioned embodiment, the description has been made by exemplifying the case where in a plan view, the concave portion 119a and the convex portion 119b of the stepped portion 119 have circular shapes, and the concave portion 119a and the convex portion 119b are formed over the whole circumference of the through hole 118. In this modification 1, the description is made by exemplifying a case where a stepped portion is formed only on a portion of the whole circumference of a through hole 118.

In the description made hereinafter, there may be a case where parts identical with the corresponding parts in the above-mentioned embodiment are given the same symbols, and the description of the parts is omitted. The same goes for succeeding modifications.

Figure 8:
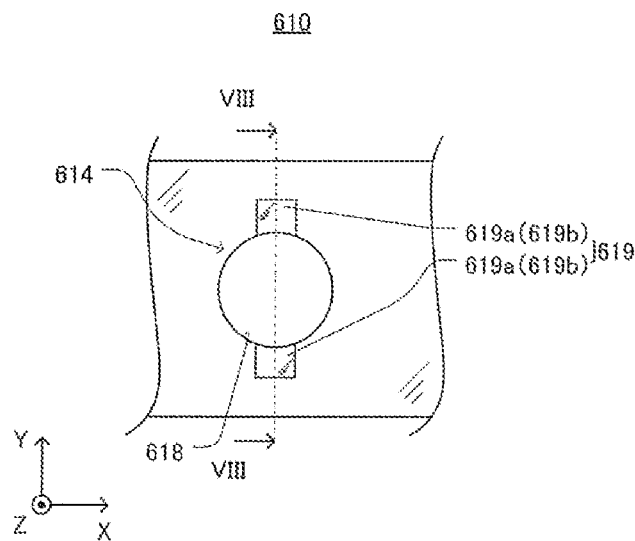
FIG. 8 is a top plan view showing the schematic configuration of a positive electrode terminal mounting portion of a lid plate according to a modification 1.
Figure 9:
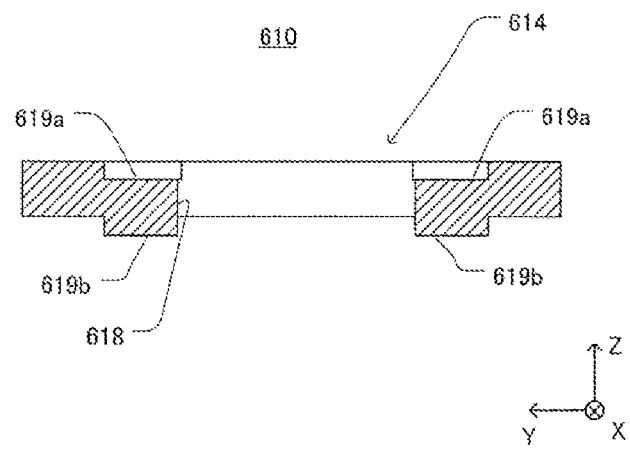
FIG. 9 is a cross-sectional view showing the schematic configuration of the lid plate according to the modification 1.

FIG. 8 is a top plan view showing the schematic configuration of a positive electrode terminal mounting portion 614 of a lid plate 610 according to the modification 1. To be more specific, FIG. 8 is a view corresponding to FIG. 5. FIG. 9 is a cross-sectional view showing the schematic configuration of the lid plate 610 according to the modification 1. To be more specific, FIG. 9 is a cross-sectional view as viewed from a YZ plane including line VIII-VIII in FIG. 8.

As shown in FIG. 8 and FIG. 9, a stepped portion 619 is formed on portions of a periphery of the through hole 618 in the positive electrode terminal mounting portion 614 according to the modification 1. To be more specific, the stepped portion 619 is formed so as to include extensions of a diameter of the through hole 618 along a short-side direction (Y axis direction) of the lid plate 610. The stepped portion 619 is divided in two by the through hole 618, and includes two concave portions 619a and two convex portions 619b. Two concave portions 619a are formed on one main surface (outer surface) of the lid plate 610. Two convex portions 619b are formed on the other main surface (inner surface) of the lid plate 610. Two concave portions 619a and two convex portions 619b are disposed opposite to each other. The shape of the concave portion 619a and the shape of the convex portion 619b approximately match each other as viewed in a plan view.

The lid plate 610 has an approximately rectangular profile and hence, the lid plate 610 is liable to bend in the longitudinal direction. However, by forming the stepped portion 619 such that the stepped portion 619 includes the extensions of the diameter of the through hole 618 along the short-side direction as in the case of the modification 1, bending of the lid plate 610 in the longitudinal direction can be suppressed.

Although the energy storage devices according to the embodiment of the present invention and the modification of the embodiment have been described, the present invention is not limited to the above-mentioned embodiment and modification of the embodiment. That is, it should be construed that the embodiment and the modification of the embodiment disclosed in this specification are only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention.

For example, in the above-mentioned embodiment and the modification of the embodiment, the energy storage device 10 includes one electrode assembly 140. However, the energy storage device 10 may include a plurality of electrode assemblies.

In the above-mentioned embodiment and the modification of the embodiment, the positive electrode terminal 200 formed by integrally molding the bus bar connecting portion 210 and the shaft portion 220 is exemplified. However, the bus bar connecting portion and the shaft portion may be provided as separate bodies before assembling, and the bus bar connecting portion and the shaft portion may be integrally joined to each other after assembling as a positive electrode terminal. In this case, the shaft portion which is provided as the member separate from the bus bar connecting portion is formed of a conductive member.

In the above-mentioned embodiment, the description has been made by exemplifying the case where the concave portion 119a and the convex portion 119b of the stepped portion 119 are formed by half-blanking. However, a method for forming the concave portion 119a and the convex portion 119b is not limited to such a method. For example, other press working including drawing can be also used. Further, the lid plate 110 having the concave portion 119a and the convex portion 119b may be formed by other methods including casting and cutting working in place of press working.

In the above-mentioned embodiment, the swaged portion (distal end portion 230) of the conductive member (shaft portion 220) is positioned in the inside of the case 100 and hence, the concave portion 119a is formed on the outer surface of the lid plate 110, and the convex portion 119b is formed on the inner surface of the lid plate 110. However, in the case where a swaged portion of a conductive member is positioned outside a case, a convex portion may be formed on an outer surface of a lid plate, and a concave portion may be formed on an inner surface of the lid plate. In the case where a conductive member has a swaged portion both in the inside of the case and outside the case, a convex portion may be formed on either one of an outer surface or an inner surface of a lid plate which is considered more effective to acquire an advantageous effect of the present invention.

In the above-mentioned embodiment, the case is exemplified where the shaft portion 220 of the positive electrode terminal 200 is fastened to the positive electrode current collector 120 by swaging. However, the shaft portion 220 may be fastened to the positive electrode current collector 120 by screwing.

In the above-mentioned embodiment, the case is exemplified where the concave portion 119a and the convex portion 119b are formed on the lid plate 110 which is a part of the case 100. However, when a conductive member is mounted on a case body, a concave portion and a convex portion may be formed on the case body.

In the above-mentioned embodiment, the description has been made with respect to the specific configuration of portions which are the technical features of the present invention by exemplifying the configurations on the positive electrode side. However, it is needless to say that substantially the same configurations are applied also to the negative electrode side. The configurations on the positive electrode side and the configurations on the negative electrode side may differ from each other without departing from the gist of the present invention.

The configurations which are made by arbitrarily combining the configurations of the above-mentioned embodiment and the configurations of the modifications are also included in the scope of the present invention.

INDUSTRIAL APPLICABILITY

The present invention is applicable to an energy storage device and the like such as a lithium ion secondary battery.

DESCRIPTION OF REFERENCE SIGNS

10: energy storage device
100: case
110, 110A, 610: lid plate
111: case body
112: gas release valve
113: electrolyte solution filling port
114, 614: positive electrode terminal mounting portion
115: negative electrode terminal mounting portion
116: first bulging portion
117: second bulging portion
117a: hollow portion
118, 123, 154, 172, 618: through hole
119, 619: stepped portion
119a, 119d, 161, 619a: concave portion
119b, 119e, 619b: convex portion
119c: tapered surface
119f: outer edge portion
120: positive electrode current collector
121: current collector body portion
122: electrode assembly connecting portion
130: negative electrode current collector
140: electrode assembly
150: positive electrode first sealing member
150a: thin wall thickness portion
151: accommodating concave portion
152: cylindrical portion
153: terminal accommodating portion
153a, 173: engaging concave portion
153b: engaging convex portion
160: negative electrode first sealing member
170: positive electrode second sealing member
171: current collector holding portion
200: positive electrode terminal
201: negative electrode terminal
210: bus bar connecting portion (terminal main body)
210a: pedestal
220: shaft portion (conductive member)
230: distal end portion (swaged portion)
500: plate
510: punch
515, 515a: presser
520, 520: die
521a: recess
H1: inner diameter
H2: outer diameter
L1: recessed amount
L2: protrusion amount

The invention claimed is:
1. An energy storage device, comprising:
a conductive member which penetrates a case and is connected to a terminal main body,
wherein the case includes:
a through hole through which the conductive member penetrates;

a concave portion which is at least a portion of a periphery of the through hole, and is formed on one of an inner surface and an outer surface of the case; and a convex portion which is formed at a position opposite to the concave portion on an other one of the inner surface and the outer surface of the case, and wherein, in a plan view of the outer surface, the terminal main body has a shape such that at least a portion of the terminal main body is larger than the concave portion, and wherein the through hole is provided in the concave portion.

2. The energy storage device according to claim 1, wherein the conductive member includes a swaged portion which is formed by swaging, and wherein the convex portion is formed on one of the inner surface and the outer surface on which the swaged portion is formed.

3. The energy storage device according to claim 2, wherein, in the plan view, the convex portion is larger than the swaged portion.

4. The energy storage device according to claim 1, wherein, in the plan view, the convex portion has a shape which matches the concave portion.

5. The energy storage device according to claim 1, wherein, in the plan view, the convex portion and the concave portion have circular shapes so as to surround the through hole.

6. The energy storage device according to claim 1, wherein, assuming a plate thickness of the case as "t", a recessed amount of the concave portion and a protrusion amount of the convex portion are t/5 or more and t/2 or less, and are commensurate.

7. A method for manufacturing the energy storage device according to claim 1, the method comprising:

forming the concave portion and the convex portion by half-blanking a plate which composes the case.

8. The energy storage device according to claim 1, wherein the terminal main body includes a pedestal projecting toward the case.

9. The energy storage device according to claim 8, wherein, in the plan view of the outer surface, the pedestal overlaps with the concave portion.

10. The energy storage device according to claim 8, wherein the pedestal opposes the concave portion.

11. The energy storage device according to claim 8, further comprising a sealing member including a concave portion and a convex portion, the convex portion of the sealing member being engaged with the concave portion of the case, and the pedestal being engaged with the concave portion of the sealing member.

12. The energy storage device according to claim 11, wherein the sealing member extends between the concave portion of the case and the terminal main body.

13. The energy storage device according to claim 11, wherein the sealing member further includes a wall projecting away from the case.

14. The energy storage device according to claim 1, wherein the concave portion of the case includes a tapered surface at an outer periphery of the concave portion of the case.

15. The energy storage device according to claim 1, wherein, in the plan view of the outer surface, an entirety of the through hole is located inside of the concave portion.

16. An energy storage device, comprising:

a case; and an electrode terminal comprising a terminal main body and a conductive member which penetrates the case and is connected to the terminal main body, wherein the case includes:

a through hole through which the conductive member penetrates;

a concave portion extending on one of an inner surface and an outer surface of the case; and a convex portion extending at a position opposite to the concave portion on an other one of the inner surface and the outer surface of the case, and wherein, in a plan view, the through hole overlaps with the concave portion and wherein the through hole is provide in the concave portion.

17. The energy storage device according to claim 16, wherein the concave portion of the case includes a tapered surface at an outer periphery of the concave portion which is chamfered over a circumference of the outer periphery of the concave portion.

18. The energy storage device according to claim 16, wherein the terminal main body includes a pedestal projecting toward the case, and wherein, in the plan view, the pedestal overlaps the concave portion.

19. The energy storage device according to claim 18, further comprising a sealing member including a concave portion and a convex portion, the convex portion of the sealing member abutting the concave portion of the case, and the pedestal abutting the concave portion of the sealing member.

20. The energy storage device according to claim 19, wherein the sealing member extends between the concave portion of the ease and the terminal main body, and wherein the sealing member further includes a wall projecting away from the case.

* * * * *